United States Patent [19]

Gardner

[11] 4,314,930
[45] Feb. 9, 1982

[54] COMPOSITION CONTAINING A HALF ESTER OF AN ORGANIC POLYOL, AN UNSATURATED MONOMER, AN EPOXIDE, AND REINFORCING FIBER

[75] Inventor: Hugh C. Gardner, Somerville, N.J.

[73] Assignee: Union Carbide Corporation, New York, N.Y.

[21] Appl. No.: 167,884

[22] Filed: Jul. 22, 1980

Related U.S. Application Data

[63] Continuation-in-part of Ser. No. 147,098, May 7, 1980, abandoned, which is a continuation of Ser. No. 70,007, Aug. 27, 1979, abandoned.

[51] Int. Cl.$^3$ .............................................. C08L 63/10
[52] U.S. Cl. ............................ 260/42.18; 260/18 PF; 260/42.28; 525/329; 525/423; 528/33; 528/37; 528/93; 528/95; 528/103; 528/110; 528/115; 528/361; 528/365
[58] Field of Search ...................... 260/18 PF, 37 EP; 528/33, 37, 103, 110, 115, 361, 365, 93, 95; 260/42.28, 42.18; 525/329, 423

[56] References Cited

U.S. PATENT DOCUMENTS

| | | | |
|---|---|---|---|
| 2,890,194 | 6/1959 | Phillips et al. | 260/45.4 |
| 2,890,197 | 6/1959 | Phillips et al. | 260/45.4 |
| 3,089,863 | 5/1963 | Hicks et al. | 260/75 |
| 3,375,301 | 3/1968 | Case et al. | 260/869 |
| 3,506,736 | 4/1970 | Najvar | 260/835 |
| 3,516,955 | 6/1970 | Taft | 260/22 |
| 3,784,586 | 1/1974 | Thomas et al. | 260/861 |
| 4,086,294 | 4/1978 | Koleske et al. | 260/834 |
| 4,137,279 | 1/1979 | Smith et al. | 260/861 |

FOREIGN PATENT DOCUMENTS 518346  9/1953  Belgium .

Primary Examiner—Earl A. Nielsen
Attorney, Agent, or Firm—Donald M. Papuga

[57] ABSTRACT

Described herein is a molding composition comprising:

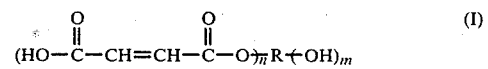

wherein n is a number having an average value of about 1.5 to less than about 4, m is equal to the free valence of R less the average value of n, R is the hydroxyl-free residue of an organic polyol which contained from 2 to 4, inclusive, hydroxyl groups, OH, in formula (I), (b) maleic anhydride, (c) an epoxide containing two or more 1,2-epoxide radicals, (d) an ethylenically unsaturated monomer which forms a liquid homogeneous mixture with the half ester, maleic anhydride and epoxide, and (e) one or more reinforcing fibers having a melting point or a glass transition temperature above about 130° C.

18 Claims, No Drawings

COMPOSITION CONTAINING A HALF ESTER OF AN ORGANIC POLYOL, AN UNSATURATED MONOMER, AN EPOXIDE, AND REINFORCING FIBER

This application is a Continuation-In-Part of our prior U.S. Patent Application Ser. No. 147,098, filed May 7, 1980, now abandoned which in turn is a continuation application of U.S. Patent Application Ser. No. 070,007, filed Aug. 27, 1979, which is now abandoned.

This invention is directed to a molding composition which can be employed in the manufacture of shaped articles, and particularly in the manufacture of fiber-reinforced plastic compositions. Molded articles made from the compositions of this invention are especially suitable for automotive applications and appliance housings.

Fiberglass has been widely used as a reinforcement in the manufacture of thermoset molded articles. These types of articles have been termed "Glass Reinforced Plastics" (GRP) and "Glass Fiber Reinforced Plastics" (FRP). The fiberglass content in these thermoset molded articles ranges from about 15 to about 75–80 weight percent. Polyester resins are often used as the resin component in these glass reinforced thermoset plastics.

An unsaturated polyester widely used in GRP for automotive applications is made from maleic anhydride and propylene glycol. However, due to the requirements of increased toughness, newer commercial polyesters utilized in automotive applications are frequently more complex in their structure. They are typically derived from the coreaction of maleic anhydride, isophthalic or terephthalic acids, or their esters, and glycols, such as propylene glycol, dipropylene glycol and/or ethylene glycol. Maleic anhydride or acid is a starting component in these polyesters. The molecular weight (Mn) of these polyesters can range from about 500 to 5,000. However, most of the commercial polyesters have molecular weights (Mn) of from about 1,300 to 2,500 and are randomly terminated with carboxyl or hydroxyl moieties.

U.S. Patent Application Ser. No. 129,884, filed Mar. 27, 1980, in the names of H. C. Gardner, et al. and titled "Half Esters of Organic Polyols And A Process For Their Production", describes a composition comprising a homogeneous liquid mixture of (a) a half ester of an organic polyol characterized by the following empirical formula:

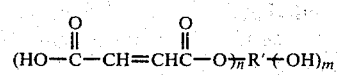

wherein n is a number having an average value of about 1.8 to less than about 4, m is equal to the free valence of R' less the average value of n, R' is the hydroxyl-free residue of an organic polyol which contained from 2 to 4, inclusive, hydroxyl groups, OH, in the formula, (b) maleic anhydride, (c) an ethylenically unsaturated monomer which forms a liquid homogeneous mixture with and is copolymerizable with the half ester and maleic anhydride, and (d) a basic compound. This composition may additionally contain one or more reinforcing fibers having a melting point or a glass transition temperature above about 130° C.

Belgium Pat. No. 518,346 describes compositions containing triethylene glycol maleate, bisphenol-A epoxy resin, and styrene, as in Examples 5 and 17, which are cured for 8 hours at 80° C., then for 7 hours at 160° C., to form clear hard resins. This reference does not describe the addition of fibrous reinforcement to the composition.

THE INVENTION

This invention is directed to a molding composition comprising a half ester of an organic polyol, maleic anhydride, an ethylenically unsaturated monomer, an epoxide containing two or more 1,2-epoxide radicals, one or more reinforcing fibers, and optionally, a base.

It has been found that the addition of an epoxide with two or more 1,2-epoxide radicals to the compositions of U.S. Patent Application Ser. No. 129,884, supra, results in the formation of homogeneous liquid mixtures at room temperature with a wide variety of polyols. Additionally, cured articles formed from the epoxide-containing compositions of this invention possess increased toughness as well as reduced water sorption in comparison to those cured articles formed from the compositions of U.S. Patent Application Ser. No. 129,884.

Copending U.S. Patent Application Ser. No. 129,884 describes half esters of many polyols which are suitable for forming homogeneous mixtures with vinyl monomers. However, at room temperature there are only a limited number of polyols which afford adducts with maleic anhydride that are soluble in styrene. For example, 2,2,4-trimethyl-1,3-pentanediol yields a product with maleic anhydride which is soluble. However, two phase liquid mixtures are obtained when styrene is added to the maleic anhydride reaction products of either propylene glycol or diethylene glycol. It has now been found that the addition of an epoxide containing at least two 1,2-epoxide radicals to such two phase mixtures results in the formation of single homogeneous mixtures at room temperature. These mixtures may then be cured to give uniform rigid parts.

Further, it has been found that the compositions of this invention can be formed into composites which possess high stiffness and strength with cure times of 25 minutes or less. This is not described or suggested in the Belgium patent, supra.

The curable molding composition of this invention comprises (a) a half ester of the following empirical formula:

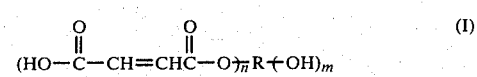 (I)

wherein n is a number having an average value of about 1.5 to less than about 4, m is equal to the free valence of R less the average value of n, R is the hydroxyl-free residue of an organic polyol which contained from 2 to 4, inclusive, hydroxyl groups, OH, in formula (I), (b) maleic anhydride, (c) an epoxide containing two or more 1,2-epoxide radicals, (d) an ethylenically unsaturated monomer which forms a liquid homogeneous mixture with (a), (b) and (c), (e) one or more reinforcing fibers having a melting point or a glass transition temperature above about 130° C., and optionally, a basic compound.

The half ester of the organic polyol is characterized by the following empirical formula:

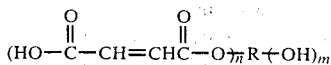

(I)

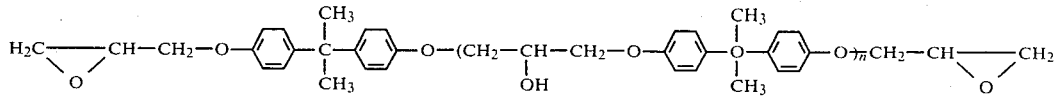

This half ester is formed by the reaction of maleic anhydride and an organic polyol. The reaction product contains at least 1.5 ester groups. If the polyol contains 4 hydroxyl groups, the reaction product can possess up to 4 half ester groups. If the number of half ester groups is less than the number of hydroxyl groups available from the polyol, the reaction product will contain residual hydroxyl groups. Typically, the maleic anhydride content of the composition does not exceed a total of about 20 mole percent of the amount of maleic anhydride employed in producing the half ester.

The organic polyol which is reacted with maleic anhydride to form the half ester depicted by empirical formula (I), is typically a polyol which contains at least two carbon atoms and which may contain from 2 to 4, inclusive, hydroxyl groups. These polyols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, 2,2-dimethyl-1,3-propanediol, polypropylene glycol having an average molecular weight of about 150 to about 600 and having 2 to 4 terminal hydroxyl groups, triethylene glycol, 1,4-cyclohexanedimethanol, 2,2-dimethyl-3-hydroxypropyl 2,2-dimethyl-3-hydroxypropionate, triethanolamine, 1,3-butanediol, tetraethylene glycol, 2,2-bis(4-hydroxyphenyl)propane and the ethylene and propylene oxide adducts of 2,2-bis(4-hydroxyphenyl)propane, pentaerythritol, erythritol, glycerine, trimethylolpropane, 1,4-butanediol, 1,6-hexanediol, tripropylene glycol, 2,2-bis(4-hydroxycyclohexyl)propane, 1,2,6-hexane triol, 1,3-propanediol, and the like. The most preferred organic polyols are 2,2-dimethyl-3-hydroxypropyl 2,2-dimethyl-3-hydroxypropionate, propylene glycol, diethylene glycol, and the ethylene oxide and propylene oxide adducts of 2,2-bis(4-hydroxyphenyl) propane. The use of mixtures of the aforementioned polyols in producing half esters is very desirable.

As described below, the half esters of formula (I) is formed by reacting maleic anhydride with the polyol. Since the reaction is reversible, a portion of the original charge of maleic anhydride is carried into the final product. Therefore, the maleic anhydride/polyol reaction product contains both the half ester of formula (I) and maleic anhydride.

The epoxides containing two or more 1,2-epoxide radicals which are suitable for use in this invention are of two general types. The first contains a plurality of 1,2-epoxide groups derived from the reaction of a polyfunctional active hydrogen containing compound with an excess of an epihalohydrin under basic conditions. These epoxides are called polyglycidyl compounds. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl)propane, also known as bisphenol A, and have structures such as the following:

where n has a value from about 0 to about 10. These epoxides are bisphenol-A epoxy resins. They are available commercially under the trade names such as "Epon 828," "Epon 1004", and "Epon 1010" from Shell Chemical Co. and "DER 331", "DER 332", and "DER 334" from Dow Chemical Co. The most preferred bisphenol A epoxy resins have an "n" value between 0 and 2.

Other polyfunctional active hydrogen compounds can be used to make polyglycidyl adducts suitable for use in the practice of this invention. These include amines, amino alcohols and polycarboxylic acids. Adducts derived from amines and aminophenols include N,N-diglycidyl propylaniline, N,N,N',N'-tetraglycidyl-4,4'-diamino-diphenyl methane, O,N,N-triglycidyl-4-aminophenol or N,N'-dimethyl-N,N'-diglycidyl-4,4'-diamino-diphenylmethane.

Polyepoxides which are polyglycidyl ethers of 4,4'-dihydroxy diphenyl methane, 4,4' dihydroxy diphenyl sulfone or tris (4-hydroxyphenyl) methane are useful in this invention.

Also suitable for use herein are the glycidyl esters of carboxylic acids. Such glycidyl esters include, for example, diglycidyl phthalate and diglycidyl adipate. Polyepoxides prepared from polyols such as pentaerythritol, glycerol, butanediol or trimethylol propane and an apihalohydrin are also useful. There may also be used polyepoxides such as triglycidyl cyanurates and isocyanurates, N,N-diglycidyl oxamides, N,N'-glycidyl derivatives of hydantoins, diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methylmethacrylate-glycidyl acrylate and 62.5:24:13.5 methylmethacrylate:ethyl acrylate:glycidyl methacrylate.

Silicone resins containing epoxy functionality (e.g. 2, 4, 6, 8, 10-pentakis [3-(2,3-epoxypropoxy)propyl]2, 4, 6, 8, 10-pentamethylcyclopentasiloxane and the diglycidyl ether of 1,3-bis-(3-hydroxypropyl)tetramethyldisiloxane) are also useable.

Many suitable polyglycidyl compounds are available commercially. In addition to the bisphenol-A epoxy resins mentioned above, these include flame retardant epoxy resins (e.g., "DER-580", a brominated bisphenol type epoxy resin available from Dow Chemical Co.), 1,4-butanediol diglycidyl ether (e.g., "Araldite RD-2" from Ciba-Geigy Corporation), polyglycidyl ether of phenol-formaldehyde novolak (e.g., "DEN-431" and "DEN-438" from Dow Chemical Co.)., polyglycidyl ether of cresol formaldehyde novolak (e.g., ECN-1273 from Ciba-Geigy Corporation), N,N'-diglycidyl derivative of dimethyl hydantion (e.g., XB-2793 from Ciba Geigy Corporation), resorcinol diglycidyl ether (e.g., Kopoxite from Koppers Co., Inc), and a methylolated bisphenol A epoxy resin (e.g., Apogen 101 made by Schaefer Chemical Co.).

Another type of epoxide containing 1,2-epoxide radicals is made by epoxidation of dienes or polyenes. Commercial examples of these epoxides include vinylcyclohexene dioxide (e.g. "ERL-4206" from Union Carbide Corp.), 3,4-epoxycyclohexylmethyl 3,4-epoxycyclohexane carboxylate (e.g. "ERL-4221" from Union Carbide Corp.), 3,4-epoxy-6-methylcyclohexylmethyl 3,4-epoxy-6-methylcyclohexane carboxylate (e.g. "ERL-4201" from Union Carbide Corp.), bis(3,4-epoxy-6-methylcyclohexylmethyl)adipate (e.g. "ERL-4289" from Union Carbide Corp.), bis(2,3-epoxycyclopentyl) ether (e.g., "ERL-0400" from Union Carbide Corp.), dipentene dioxide (e.g. "ERL-4269" from Union Carbide Corp.) 2-(3,4-epoxycyclohexyl-5, 5-spiro-3,4-epoxy) cyclohexane-metadioxane (e.g. "ERL-4234" from Union Carbide Corp.), and epoxidized polybutadiene (e.g. "Oxiron 2001" from FMC Corp.).

Other suitable epoxidized polyenes include epoxidized natural oils including soybean oil, tung oil, and linseed oil. These materials contain a distribution of mono and polyunsaturated oligomers.

In general, the epoxide is composed of oligomers containing two or more 1,2-epoxide radicals. It is possible to add to the epoxide component monoepoxides such as styrene oxide, propylene oxide, epoxycyclohexane, glycidyl esters of monocarboxylic acids and the like. In general, these components will reduce the water sorption tendencies of the cured composition in much the same manner as epoxides containing two or more 1,2-diepoxide radicals. Amounts of monoepoxides of up to 50 percent by weight based on the total epoxide may be used.

The ethylenically unsaturated monomer employed in the composition of this invention is one which forms a liquid homogeneous mixture with maleic anhydride and the half ester structure depicted by formula (I) and the epoxide.

In addition, the ethylenically unsaturated monomer has to be copolymerizable with maleic anhydride and the half esters.

Suitable ethylenically unsaturated monomers which may be employed in the practice of this invention are one or more monomers which contain a

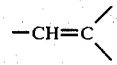

group, and preferably a

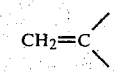

group. These monomers include styrene and its derivatives and homologues, diallyl phthalate, divinylbenzene, acrylic acid or methacrylic acid and their derivatives such as their esters, amides or nitriles, e.g., methyl acrylate, methyl methacrylate, n-butyl methacrylate, acrylamide, methacrylamide, acrylonitrile, methacrylonitrile, and the like. Also the monomers include vinyl ethers and esters, e.g., vinyl acetate vinyl propionate, methyl vinyl ether, and the like, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene since it has the most significant commercial utilization for such purposes.

The compositions of this invention contain a molar ratio of half ester to maleic anhydride ranging from about 3:1 to about 200:1, preferably from about 6:1 to about 100:1. In the most typical and desirable embodiment, the mole ratio of half ester to maleic anhydride is from about 10:1 to about 30:1.

The compositions of this invention are desirably produced by effecting an intermixture of the maleic anhydride/organic polyol reaction product, an ethylenically unsaturated monomer and the epoxide. Also, a basic compound may be present in the maleic anhydride/organic polyol reaction product. The basic compound acts, inter alia, as a catalyst for the anhydride/organic polyol reaction.

The basic compound is selected from an amine or a metal salt of an alcohol or carboxylic acid, or a metal oxide or hydroxide.

The metal salt of the alcohol includes sodium methoxide, potassium ethoxide and lithium isopropoxide. The metal salt of a carboxylic acid includes sodium acetate and potassium benzoate. The metal oxide or hydroxides include the alkali metal hydroxides such as potassium hydroxide, and sodium hydroxide. Magnesium oxide is an example of a suitable metal oxide. Characteristic of all the bases which are suitable for use in this invention is that when 1 gram of the basic compound is dissolved in 100 milliters of water the pH is greater than 7.

A preferred basic compound is a secondary or tertiary amine. These amines have a $pK_b$ in the range of 3 to 12.

Amines suitable for use in the practice of this invention include the following:

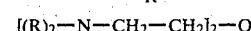

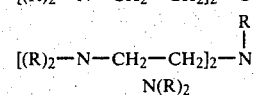

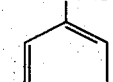

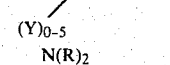

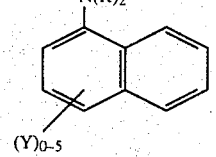

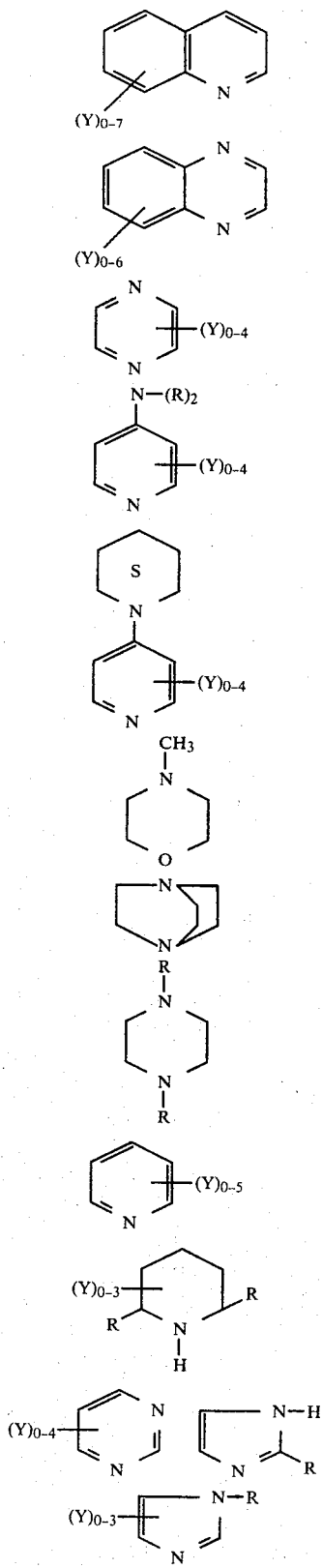

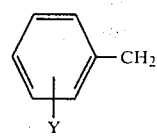

Y is independently selected from alkyl of 1 to 4 carbon atoms, alkoxy of 1 to 4 carbon atoms and halogen.

Additional amines suitable for use herein include 1,5-diazabicyclo[5.4.0]-undec-5-ene; 1,5-diazabicyclo[4.3.0]-non-5-ene.

Components (a), (b), (c) and (d) of this invention form liquid mixtures at temperatures ranging from about 20° C. to about 70° C. They typically possess room temperature viscosities in the range of about 10 to about 500 centipoises with 40 weight percent of an ethylenically unsaturated monomer, such as styrene. Preferably, with this monomer level, the solution viscosities are between about 20 and about 300 centipoises. The half esters of formula (I) in this invention have molecular weights which range from about 250 to about 900. The acid numbers of the anhydride/polyol reaction products of this invention range from about 70 to about 500. Preferably, the acid number is between about 100 to about 300.

To prepare the half ester of formula (I), the polyol and maleic anhydride are typically combined in a molar ratio of one mole of maleic anhydride per mole of hydroxyl group in the absence of a solvent. The reactants are heated at 60° to 130° C. for one to five hours. These conditions are sufficient to convert more than 75 percent of the original charge of the anhydride to half esters. When a catalytic amount of a basic compound is added to the mixture of reactants, the reaction time can be reduced to less than 30 minutes.

After about 70 percent of the maleic anhydride has reacted, an ethylenically unsaturated monomer may be added. The temperature of the liquid body is rapidly reduced to the desired temperature or to room temperature. The lower temperature is optional and is dependent upon the method used to carry out the process, the type of equipment being used, and the manner in which the composition produced will be utilized.

It is also possible to prepare the maleic anhydride/polyol reaction product directly in the presence of the polymerizable monomer. In this process, a liquid mixture is prepared by blending maleic anhydride, a polyol, a vinyl monomer and a vinyl polymerization inhibitor at a temperature of from about 15° to about 60° C. To this mixture it is desirable to add a catalytic amount of a basic compound such as a tertiary amine. The basic compound catalyzes the in situ formation of half esters from the reaction of the polyol and maleic anhydride. The amount of basic compound employed ranges from about 0.2 to about 2.0 weight percent of the total mixture. The time needed to react more than 70 percent of the maleic anhydride ranges from about 5 minutes to a few days.

In preparing the polyol/anhydride reaction product, the reaction equilibrium between maleic anhydride and organic polyol favors maximum reaction of maleic anhydride at the lowest temperature. When effecting the reaction at elevated temperature, viz, 80° C., an equilibrium composition in which about 80 percent of the maleic anhydride is reacted with the organic polyol to produce the half ester may be achieved within a reasonwherein the R's are independently selected from alkyl of 1 to 8 carbon atoms such as $CH_3$, $C_2H_5$, $C_3H_7$, $C_4H_9$, and aralkyl of 7 to 15 carbon atoms such as able time period. When the reaction mixture is cooled to about room temperature, viz, 23° C., more maleic anhydride reacts with the organic polyol and a conversion of more than about 87 mole percent of maleic anhydride is achieved.

The preparation of the polyol/anhydride reaction mixture may be carried out under subatmospheric, atmospheric, and superatmospheric pressure conditions. However, atmospheric pressure conditions are generally used.

The maleic anhydride/polyol reaction is desirably conducted in the absence of water. It is frequently impossible, in a practical operation of this process, to insure that all of the reactants will be absolutely dry and the atmosphere in which the reaction is conducted is totally free of moisture. However, in the practical operation of the present process, water in an amount equivalent to that which could theoretically convert one weight percent of the maleic anhydride used in the reaction to maleic acid can be tolerated. This is preferably considered to be the maximum amount. In the usual case water is present in a relatively trace amount resulting in considerably less than 1 weight percent of the maleic anhydride being reacted to maleic acid.

To insure that the amount of water that gets into the reaction is as low as feasible, it is desirable to utilize an inert moisture free atmosphere in carrying out the reaction. This moisture free atmosphere can be provided by relatively dry gasses such as dry nitrogen, carbon dioxide, methane, helium, argon, and the like.

In carrying out the anhydride/polyol reaction, it is desirable to mix the reactants. The degree of mixing is not critical and gentle stirring of the reaction mass is sufficient. To avoid any complications in the reaction, it is desirable to effectively disperse the basic catalyst, if used, throughout the composition.

The resinous portion of the instant invention is prepared by blending the maleic anhydride/polyol reaction product with an ethylenically unsaturated monomer, and a component containing 2 or more 1,2-epoxide groups. It is preferred to add the latter component to a mixture of the first two. Blending, which is carried out at temperatures between about 0° and about 90° C., results in the formation of a homogeneous liquid mixture.

When the compositions of this invention are cured, both radical and polar bond forming reactions take place. The ethylenically unsaturated monomer copolymerizes with the carbon-carbon double bonds in the half esters and maleic anhydride under free radical conditions. The terminal carboxyl groups on the half esters and the anhydride portion of maleic anhydride condense with the 1,2-epoxide functionality to form hydroxy esters via a polar mechanism. Additionally, epoxide homopolymerization may occur simultaneously by a polar pathway.

In the preferred embodiment the compositions are cured by use of both a source of free radicals and an epoxide curing catalyst.

Sources of free radicals suitable for curing the instant compositions include electron beam radiation, actinic radiation, azo and peroxide curing agents such as those which are described by Gallagher, et al "Organic Peroxides Review, Plastics Design & Processing," July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

The instant compositions can be cured in the absence of epoxide curing agents. However, to obtain a faster cure rate and improved properties an epoxide curing catalyst is desirably employed. These catalysts are well known in the art and include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., phosphoric acid, polyphosphoric acid, and the like; the aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the aliphatic fluoro sulfonic acids, e.g., trifluoromethane sulfonic; the stannous acylates, e.g., stannous acetate, stannous butyrate, stannous hexanoate, stannous octanoate, stannous benzoate, and the like; the stannous salts of perfluoroalkane sulfonic acids, such as tin(II) bis(trifluoromethane sulfonate); the stannic alkoxides, e.g., stannic butoxide, stannic 2-ethylhexoxide, and the like; the alkali metal hydroxides, e.g., sodium hydroxide, potassium hydroxide, and the like; the tertiary amines, e.g., trimethylamine, triethylamine, and the like. For curing compositions containing glycidyl epoxide groups, the boron trifluoride-amine complexes and tin salts of perfluoroalkane sulfonic acids are highly preferred. For compositions containing epoxidized dienes, or polyenes, the preferred catalysts are stannous acylates and boron trifluoride-amine complexes.

These catalysts are used in amounts of from about 0.01 to about 3.0 percent, based on the weight of the epoxide.

Finally it should be pointed out that many of the basic compounds which catalyze the polyol/maleic anhydride reaction also catalyze reactions between epoxide groups and hydroxyl groups as well as reaction between epoxide groups and carboxylic acid groups.

In order to avoid premature free radical polymerization it is desirable to add polymerization inhibitors to the reaction mixture. These polymerization inhibitors include tertiary butyl catechol, hydroquinone monomethyl or monoethyl ether, benzoquinone, tertiarybutyl hydroquinone, methyl hydroquinone and mixtures thereof, such as mixtures of hydroquinone monomethyl ether and methyl hydroquinone. These polymerization inhibitors are used in amounts of from about 30 to about 600 parts per million by weight.

When an effective level of free radical polymerization inhibitors is present in the instant composition, the pot life (i.e., the time in which the liquid portion of the composition becomes a non-flowable mixture due to the onset of crosslinking) depends on several factors, including the functionality of the epoxide, the nature of the epoxide, the functionality of the anhydride/polyol adduct, the level of vinyl monomer in the system, and the type and amount of epoxy catalyst. For example, the combination of a difunctional epoxy components (as opposed to tri- or tetra-functional components), glycidyl epoxides (as opposed to epoxidized olefin epoxides), difunctional maleic anhydride/polyol adducts (as opposed to tris or tetrakis (half esters), a large proportion of ethylenically unsaturated monomer, and a small amount of an epoxy catalyst all favor a long pot life. Under these conditions low viscosity liquid mixtures can be maintained for weeks at room temperature. They may be cured simply by adding a free radical initiator and applying heat.

On the other hand, the onset of gelation in the resinous portion of the instant compositions can be effected in less than one minute by the use of highly functionalized epoxide components obtained by epoxidation, low levels of ethylenically unsaturated monomer, and/or a high concentration of an active epoxy catalyst. For example, formulations containing 50 weight percent of 3,4-epoxycyclohexylmethyl 3,4-epoxy-cyclohexane carboxylate, 40 weight percent of a maleic anhydride/polyol adduct, 9 weight percent of styrene, and 1 weight percent of stannous octoate fall into this category. In view of this enhanced reactivity, such formulations are preferably mixed immediately before curing. An impingement mixing head found in commercial polyurethane reaction injection molding machines or an in-line static mixer may be used to provide effective mixing. The pot life characteristics of the resinous portion of the compositions determine the optimum fabrication schemes.

The fibers which are suitable for use in this invention as reinforcing agents have a melting point or a glass transition temperature above about 130° C. These fibers include fiberglass, carbon fibers, aromatic polyamide fibers (such as aramid fibers sold by E. I. DuPont Nemours, Wilmington, Del. under the trademark of Kevlar), metal fibers, such as aluminum and steel fibers, boron fibers and the like.

The carbon fibers include those having a high Young's modulus of elasticity and high tensile strength. These carbon fibers may be produced from "graphitizable" materials such as is described in U.S. Pat. No. 4,005,183.

The preferred fibers are fiberglass, carbon fibers and aromatic polyamide fibers.

The fibers which are suitable for use in this invention have a length of at least ¼ inch and the average length is at least ½ inch. Fibers with different lengths exceeding ¼ inch may be used, provided that at least about 50 percent of the fibers have lengths greater than ½ inch. Preferred fibers lengths are from 1 to 2 or more inches. Continuous filaments may also be used.

The compositions herein contain from about 1 to about 60, preferably from about 5 to about 55, and most preferably, from about 10 to about 50 weight percent of the maleic anhydride/polyol reaction product (i.e. the half ester of formula (I) plus maleic anhydride).

The ethylenically unsaturated monomer is present in the present composition in amounts of from about 1 to about 70, preferably from about 3 to about 65, and most preferably, from about 5 to about 60 weight percent.

The epoxide is present in the instant composition in amounts of from about 1 to about 90, preferably from about 3 to about 70, and most preferably, from about 8 to about 60 weight percent.

The composition contains from about 15 to about 80, preferably from about 35 to about 80, and most preferably from about 35 to 70 weight percent of fiber.

These compositions may be molded by a number of different processes and apparatus. A preferred procedure for producing a molded article from the compositions of this invention is described in U.S. patent application Ser. No. 135,906 entitled "Molding Process and Apparatus Therefore", and filed on Apr. 14, 1980 in the name of R. Angell, Jr., which is incorporated herein by reference. In this application, a process for rapidly fabricating fiber reinforced thermoset resin articles is described. The fiber reinforcement is comprised of one or more fibers with a melting point or a transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. patent application Ser. No. 135,906 the apparatus comprises: (a) a heatable matched die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

Another apparatus which may be used is a pressure bag mold.

Due to the low viscosities of the liquid portion of the molding compositions of this invention, they readily flow through and about and within the total confines of the mold and the fibrous material contained therein to effect a uniform distribution of the reaction product within the ultimate molded product.

For the liquid portion of the compositions of the present invention having a pot life of a few hours or more, the apparatus described in U.S. application Ser. No. 135,906 containing one or two accumulator zones is entirely adequate for making fiber reinforced composite articles. However, if they possess short pot lives, it is desirable to effect rapid mixing of the two reactive streams just prior to their entry into the mold. This can be accomplished by inserting an impingement mixing head or a static mixer in the nozzle and using two accumulator zones. In this configuration, the polyol/anhydride adduct and the epoxide component can be kept separate until parts are fabricated. The ethylenically unsaturated monomer may be stored in either or both accumulator zones.

The liquid portions of the compositions of this invention can also be used to impregnate fabrics, manufacture laid up laminate structures for use in electrical potting and casting processes to protect motors, windings, and the like.

EXAMPLES

The following examples serve to illustrate specific embodiments of this invention and it is not intended that the invention shall be limited by the examples.

EXAMPLE 1

A 3 liter, 3 necked round bottomed flask equipped with a paddle stirrer, nitrogen inlet and outlet, a thermometer equipped with a Therm-O-Watch controller, and an electric heating mantle was charged with 408.52 g (2.0 moles) of molten 2,2-dimethyl-3-hydroxypropyl 2,2-dimethyl-3-hydroxypropionate and 392.24 g (4.0 moles) of molten maleic anhydride. The solution was heated to 110° C. and held at this temperature by applying a cooling bath until the reaction exotherm subsided. The temperature was maintained at 110°±5° C. for 1.2 hours. The mixture was then cooled to room temperature and poured into a jar for storage. A sample was titrated in aqueous pyridine. The acid number was found to be 316 mg of KOH/g. Proton NMR analysis of the product, 16 days later, indicated that the maleic anhydride derived components consisted of 91 percent maleates (almost exclusively the maleate half ester with less than 5 percent maleic acid or maleate diester) and 9 percent of unreacted anhydride. No fumarate containing products were detected.

EXAMPLES 2-4

Example 1 was repeated except that a series of polyols, as described in Table 1, were reacted with maleic anhydride in a molar ratio of one mole of maleic anhydride per mole of hydroxyl group at the temperature and for the reaction times described in Table 1. All products contained less than 15 mole percent unreacted maleic anhydride. With the exception of the adduct from propylene glycol, the fumarate content of all of the products was less than 8 mole percent of the original charge of maleic anhydride. In the case of propylene glycol, the adduct contained 27 mole percent of the original charge of maleic anhydride in the fumarate form.

TABLE 1

| Example | Polyol reacted Type | Amount(g) | Reaction Time(hr.) | Reaction Temperature(C.°) |
|---|---|---|---|---|
| 2 | propylene glycol | 440.6 | 2.0 | 105–115 |
| 3 | dipropylene glycol | 268.4 | 4.6 | 110–125 |
| 4 | neopentyl glycol | 312.4 | 1.0 | 120–125 |

The reaction products of Examples 1 to 4 were used to make polyester/epoxy resins in subsequent examples.

EXAMPLE 5

The apparatus as described in Example 1 was charged with 547.3 g of dipropylene glycol and 800 g of maleic anhydride. The mixture was warmed to 43° C. and 5.23 ml (0.4 weight percent) of N-methylimidazole was added by syringe to the rapidly stirred mixture. Immediately the reaction mixture changed from colorless to dark brown. The temperature of the mixture was raised to 120° C. over the next 18 minutes by the intermittent application of heat. Twenty minutes after addition of the catalyst, a sample was removed for analysis by titrimetric methods. The amount of unreacted maleic anhydride present was 23 percent of the original charge. The temperature of the reaction was gradually decreased from 120° C. to 63° C. over the next 60 minutes. At the end of this period, a sample was removed for NMR analysis and 0.31 g of hydroquinone was added. NMR analysis showed that the distribution of maleic anhydride containing products was as follows:

88 mole percent maleates (half ester, diesters, and maleic acid), 0.5 mole percent fumarates, 11.5 mole percent unreacted maleic anhydride.

Less than 2 percent of the original maleic anhydride charged was present as either maleic acid or maleate diesters.

EXAMPLES 6 AND 7

Examples 6 and 7 show how addition of a diepoxide to a two phase liquid mixture containing a maleic anhydride capped polyol and styrene results in the formation of a homogeneous liquid mixture which can be cured to give a rigid thermoset casting.

EXAMPLE 6

An 8 ounce jar was charged with 30 g of the reaction product of maleic anhydride and propylene glycol prepared in Example 2, and 30 g of styrene. The two phase mixture was inhibited with 500 parts per million (ppm) of t-butyl hydroquinone. The mixture was stirred and heated to 80° C. to determine if solubility could be induced by heating. A homogeneous solution was not obtained.

The mixture was cooled to room temperature and increments of an epoxy resin made from bisphenol-A and epichlorohydrin (ERL 2774 made by Union Carbide Corporation) were added. This material contained two 1,2-epoxide groups per molecule and had a weight per epoxy equivalent of 190. After 20 g of the diepoxide had been added (about five minutes), a homogeneous solution formed. The solution could not be separated by centrifugation. The appearance of the solution was unchanged after 24 hours.

EXAMPLE 7

A two phase mixture was prepared from 30 grams of the reaction product of propylene glycol and maleic anhydride prepared in Example 2, 30 g of styrene, and 0.03 grams of t-butyl hydroquinone. This mixture was treated with increments of 3,4-epoxycyclohexylmethyl 3,4-epoxycyclohexane carboxylate (ERL-4221 sold by Union Carbide Corporation) at room temperature. After 30 g of the diepoxide had been added (about five minutes), a homogeneous solution was formed would could not be separated by centrifugation.

EXAMPLE 8 TO 10

The following Examples 8 to 10 describe the preparation of glass reinforced composites by injecting the resin into a fiber filled mold.

EXAMPLE 8

A solution was prepared from 110.4 g of the reaction product of 2,2-dimethyl-3-hydroxypropyl 2,2-dimethyl-3-hydroxypropionate and maleic anhydride prepared as in Example 1, 60.0 g of 3,4-epoxycyclohexylmethyl 3,4-epoxycyclohexane carboxylate (ERL-4221), 129.6 g of styrene, 4.4 g of Zelec UN mold release, 1.0 g of stannous octoate and 3.0 g of t-butyl perbenzoate. A portion of this resin was injected in ten seconds into 5 plies (94 g) of PPG type AKM chopped strand mat (made by PPG Industries, Pittsburgh, Pa.) in a heated mold which was 8 inches square. The mold was pressurized to 90 psi. The ⅛ inch composite was cured for five minutes at 150° C. and then removed from the mold. The composite was then tested to determine tensile strength and modulus and elongation according to ASTM D-638, and flexural strength and modulus according to ASTM D-790. Also glass content was determined by ashing.

The results are shown in Table I.

EXAMPLE 9

A solution was prepared from 55.2 g of the reaction product of dipropylene glycol and maleic anhydride prepared as in Example 3, 30.0 g of 3,4-epoxycyclohexylmethyl 3,4-epoxycyclohexane carboxylate (ERL-4221), 64.8 g of styrene, 1.5 g of t-butyl perbenzoate, 0.2 g of stannous octoate and 2.2 g of Zelec UN. A portion of this resin was injected into a random glass mat containing 8 weight percent of excess poly(vinyl acetate) binder in a heated mold which was 8 inches square. The mat was made from type 447 roving (sold by Owens Corning Fiberglas, Toledo, Ohio) which had been chopped into one inch lengths. The ⅛ inch thick composite was cured for 5 minutes at 150° C. and removed from the mold. The composite was tested as described in Example 8.

The results are shown in Table I.

EXAMPLE 10

A solution was prepared from 95.7 g of the reaction product of propylene glycol and maleic anhydride prepared as in Example 2, 52.0 g of epoxidized polybutadiene, 112.3 g of styrene, 2.6 g of t-butyl perbenzoate, 0.8 g of stannous octoate, and 2.9 g of Zelec UN mold release. The epoxidized polybutadiene had a molecular weight of about 750 and contained about 7.5 weight percent of epoxide groups. A portion of this resin was injected into 5 plies (94 g) of PPG type AKM chopped strand mat in a heated mold which was 8 inches square. The ⅛ inch composite was cured for 5 minutes at 130° C. The composite was tested as described in Example 8.

The results are shown in Table I.

EXAMPLES 11 TO 15

In the following Examples 11 to 15, a pressure bag mold was used to prepare glass reinforced composites. The resin was poured into the mold containing the glass reinforcement.

EXAMPLE 11

A solution was prepared from 55.2 g of the reaction product of maleic anhydride with propylene glycol prepared as in Example 2, 30.0 g of 3,4-epoxycyclohexyl methyl 3,4-epoxycyclohexane carboxylate (ERL-4221), 64.8 g of styrene, 2.2 g of Zelec UN mold release, 1.5 g of t-butyl perbenzoate, and 0.2 g of stannous octoate.

The resin was applied to 5 plies (105.6 g) of PPG type AKM glass mat in a 8 inch×8 inch×⅛ inch cavity mold. The composite was cured in a press using a programmed heating cycle: 5 min. (130° C.); 3 min. (130°–150° C.); 5 min. (150° C.). The composite was removed from the mold and tested as described in Example 8.

EXAMPLE 12

A solution was prepared from 110.4 g of the reaction product of 2,2-dimethyl-3-hydroxypropyl 2,2-dimethyl-3-hydroxypropionate and maleic anhydride prepared as in Example 1, 60 g of 3,4-epoxycyclohexylmethyl 3,4-epoxycyclohexane carboxylate (ERL-4221), 129.6 g of styrene, 4.4 g of Zelec UN mold release, 1.0 g of stannous octoate and 3.0 g of t-butyl perbenzoate.

The resin was applied to 5 plies (105.6 g) of PPG type AKM glass mat in a 8×8×⅛ inch cavity mold. The composite was cured at 90° C. for 15 minutes and 130° C. for 10 minutes. The composite was removed from the mold and tested as described in Example 8.

The results are shown in Table I.

EXAMPLE 13

A solution was prepared from 73.0 g of the reaction product of propylene glycol and maleic anhydride prepared as in Example 2, 39.67 g of 3,4-epoxycyclohexylmethyl 3,4-epoxycyclohexane carboxylate (ERL-4221), 85.7 g of styrene, 2.0 g of t-butyl perbenzoate, 0.6 g of stannous octoate and 2.9 g of Zelec UN mold release. The resin was applied to 5 plies (105.6 g) of PPG type AKM glass mats in a 8×8×⅛ inch cavity mold. The composite was cured at 130° C. for 5 minutes, 130°–150° C. for 2 minutes and 150° C. for 5 minutes. The composite was removed from the mold and tested as described in Example 8.

The results are shown in Table I.

EXAMPLE 14

A solution was prepared from 50 g of the reaction product of neopentyl glycol and maleic anhydride prepared as in Example 4, 50 g of a bisphenol-A epoxy resin (Epon 828), 50 g of styrene, 0.04 g of t-butyl hydroquinone, 1.2 g of t-butyl perbenzoate, 1.0 g of an aqueous solution of Sn(II) bis(trifluoromethane sulfonate) [L-4429 sold by Minnesota Mining & Manufacturing Company] and 0.5 g of Zelec UN mold release. The resin was applied to 157 g of a random glass mat (PPG type AKM) in a 10×10×1/10 inch cavity mold. The composite was cured at 153° C. for 6 minutes. The composite was removed from the mold and tested as described in Example 8.

EXAMPLE 15

A solution was prepared from 244 g of the reaction product of dipropylene glycol and maleic anhydride prepared as in Example 5, 131 g of styrene, 0.10 g of t-butyl hydroquinone, 37.5 g of a polyglycidyl ether of a phenol-formaldehyde novolak with a weight per epoxy equivalent of 180 (D.E.N. 438 made by Dow Chemical Co.), 3.0 g of Zelec UN mold release, 4.4 g of t-butyl perbenzoate and 1.5 g of an aqueous solution of Sn(II) bis(trifluoromethane sulfonate) [L-4429]. A portion of the resin was applied to 132 g of a random glass mat (PPG type AKM) in a 10×10×1/10 inch cavity mold. The composite was cured at 157° C. for 3 minutes. A yellow, translucent composite was removed from the mold and tested as described in Example 8.

The results are shown in Table I.

The data in Table I show that composites produced with a composition containing an epoxide according to the present invention, possess an excellent combination of mechanical properties. The composites are cured in twenty five minutes or less.

TABLE I

| Example | Glass content of composite (wt. %) | Tensile Strength ($10^3$ psi) | Tensile Modulus ($10^6$ psi) | Elongation (%) | Flexural Strength ($10^3$ psi) | Flexural Modulus ($10^6$ psi) |
|---|---|---|---|---|---|---|
| 8 | 50 | 24.5 | 1.60 | 1.90 | 41.2 | 1.66 |
| 9 | 43 | 17.6 | 1.27 | 1.70 | 35.7 | 1.43 |
| 10 | 54 | 22.2 | 1.25 | 2.10 | 30.5 | 1.35 |
| 11 | 57 | 29.5 | 2.03 | 1.65 | 54.9 | 2.42 |
| 12 | 55 | 22.3 | 1.54 | 1.60 | 40.8 | 1.73 |
| 13 | 52 | 22.2 | 1.61 | 1.63 | 47.4 | 2.01 |
| 14 | 55 | 26.7 | 1.68 | 1.95 | 51.1 | 1.54 |
| 15 | 56 | 25.5 | 1.59 | 1.93 | 50.2 | 2.16 |

What is claimed is:

1. A curable molding composition having a cure time of 25 minutes or less comprising (a) a half ester characterized by the following empirical formula:

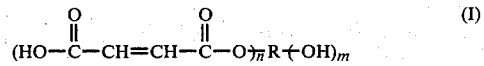 (I)

wherein n is a number having an average value of about 1.5 to less than about 4, m is equal to the free valence of R less the average value of n, R is the hydroxyl-free residue of an organic polyol which contained from 2 to 4 inclusive, hydroxyl groups, OH, in formula (I), (b) maleic anhydride, (c) an epoxide containing two or more 1,2-epoxide radicals, (d) an ethylenically unsaturated monomer which forms a liquid homogeneous mixture with the half ester, maleic anhydride and the epoxide, (e) from about 15 to about 80 weight percent of one or more reinforcing fibers having a melting point or a glass transition temperature above about 130° C. and (f) an epoxide curing catalyst.

2. A composition as in claim 1 wherein the organic polyol is selected from the group consisting of ethylene glycol, diethylene glycol, 2,2,4-trimethyl-1,3-pentanediol, propylene glycol, dipropylene glycol and polypropylene glycol having an average molecular weight of between about 150 to about 600 and having 2 to 4 terminal hydroxy groups, 2,2-dimethyl-3-hydroxypropyl 2,2-dimethyl-3-hydroxypropionate, ethylene and propylene oxide adducts of bisphenol A, 2,2-dimethyl-1,3-propanediol, 1,3-butanediol, and 1,4-butanediol.

3. A composition as in claim 1 wherein the organic polyol is a mixture of polyols.

4. A composition as in claim 1 wherein the maleic anhydride content does not exceed a total of about 25 mole percent of the amount of maleic anhydride used in producing the half ester (a).

5. A composition as in claim 1 wherein the combined amount of the half ester of formula (I) and maleic anhydride is from about 1 to about 60 weight percent.

6. A composition as in claim 1 wherein the epoxide is a polyglycidyl compound.

7. A composition as in claim 1 wherein the epoxide is derived from the epoxidation of a diene or polyene.

8. A composition as in claim 7 wherein the epoxide is selected from 3,4-epoxycyclohexylmethyl 3,4-epoxycyclohexane carboxylate, 3,4-epoxy-6-methylcyclohexylmethyl 3,4-epoxy-6-methylcyclohexane carboxylate, bis(2,3-epoxy-cyclopentyl)ether, epoxidized polybutadiene, epoxidized soybean oil, bis(3,4-epoxy-6-methylcyclohexylmethyl)adipate, vinyl cyclohexene dioxide, 2-(3,4-epoxycyclohexyl-5,5-spiro-3,4-epoxy)cyclohexane-metadioxane and dipentene dioxide.

9. A composition as in claim 1 wherein the epoxide is a copolymer of an acrylic acid ester of glycidol.

10. A composition as in claim 1 wherein the composition contains a monoepoxide.

11. A composition as in claim 1 wherein the epoxide is present in amounts of from about 1 to about 90 weight percent.

12. A composition as in claim 1 wherein the ethylenically unsaturated monomer is selected from styrene, α-methylstyrene, the lower alkyl esters of acrylic acid and methacrylic acid, and acrylonitrile.

13. A composition as in claim 1 wherein the ethylenically unsaturated monomer is present in amounts of from about 1 to about 70 weight percent.

14. A composition as in claim 1 wherein the reinforcing fiber is selected from fiberglass, carbon fibers, or polyamide fibers.

15. A composition as in claim 14 wherein the reinforcing fiber is fiberglass.

16. A composition as in claim 1 wherein the composition contains from about 15 to about 80 weight percent of the reinforcing fiber.

17. A composition as in claim 15 which contains from about 35 to about 75 weight percent of reinforcing fiber.

18. A cured molded article prepared from the composition of claims 1, or 14, or 15, or 16, or 17.

* * * * *